Feb. 2, 1971 ZENJI WAKIMOTO ET AL 3,560,079
PHOTOGRAPHIC LENS OF LARGE APERTURE RATIO
HAVING LONG BACK FOCUS
Filed Dec. 13 1968
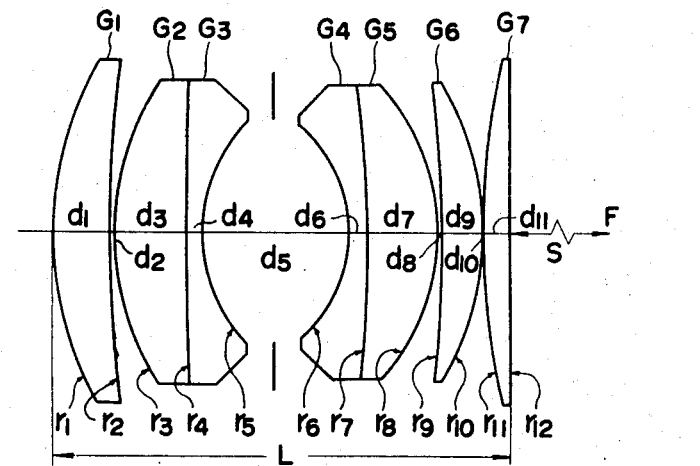
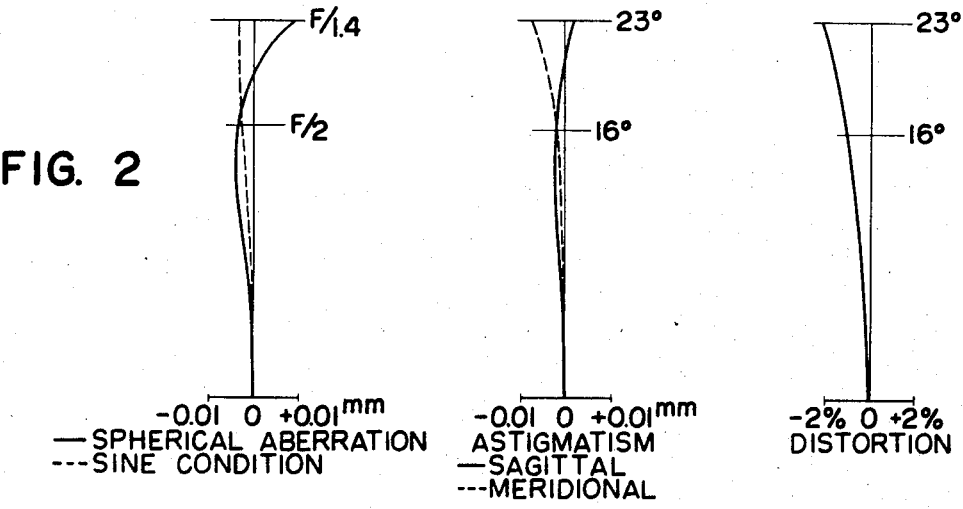
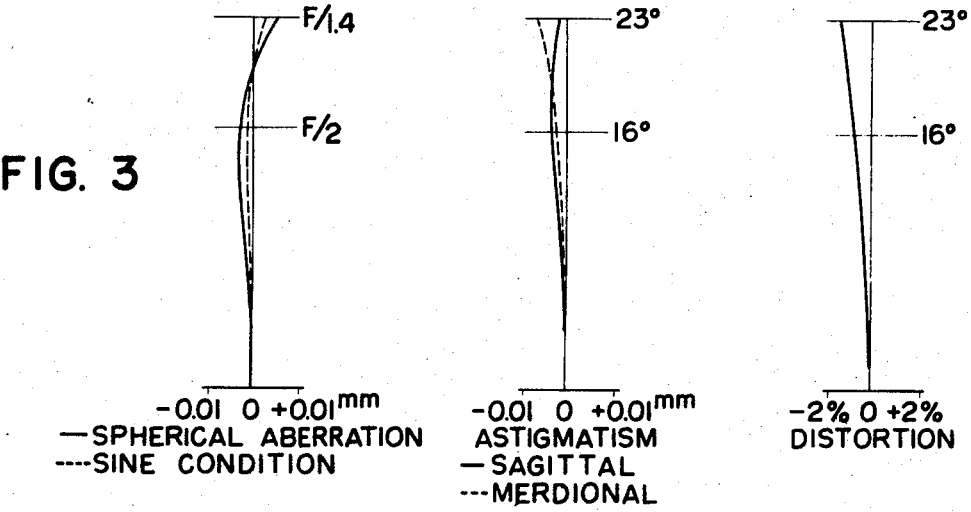
INVENTORS
ZENJI WAKIMOTO
YOSHIYUKI SIMIZU
BY
ATTORNEY

United States Patent Office 3,560,079
Patented Feb. 2, 1971

3,560,079
PHOTOGRAPHIC LENS OF LARGE APERTURE RATIO HAVING LONG BACK FOCUS
Zenji Wakimoto and Yoshiyuki Simizu, Tokyo, Japan, assignors to Nippon Kogaku K.K., Tokyo, Japan, a corporation of Japan
Continuation-in-part of application Ser. No. 460,634, June 2, 1965. This application Dec. 13, 1968, Ser. No. 795,382
Claims priority, application Japan, Nov. 12, 1964, 39/87,702
Int. Cl. G02b 9/60
U.S. Cl. 350—217                     2 Claims

ABSTRACT OF THE DISCLOSURE

Lens system of a modified Gauss type in which the thickness of the second lens group is reduced and the thickness of the third group is increased, and in which the last group is separated into two lens elements to lengthen the back focus of the system and provide a F:1.4 lens corrected for spherical and chromatic aberrations, astigmatism and coma, with an angular field of ±23°.

---

The present application is a continuation in part of our earlier application Ser. No. 460,634 filed June 2, 1965, now abandoned. This invention relates to a photographic lens and more particularly to a photographic lens of large aperture ratio having a long back focus.

In general, a lens having large aperture ratio has a tendency to be thick and of short back focus.

The back focus of a lens of large aperture ratio having a standard angular field is generally of about fifty percent of the focal length. Even in Gauss type lenses which generally have a relatively longer back focus than others, the back focus is about sixty percent of the focal length and a back focus of approximately seventy percent of the focal length in the case of a large aperture ratio lens of F:1.4 class is quite difficult.

Since a single lens reflux camera has a reflecting mirror between a lens and an image plane and the exposure is carried out by operating the mirror, it is necessary to provide a back focus longer than a certain definite length.

The lengthening of the focal length of the lens makes the back focus proportionally longer so that such a lens can be adapted to reflex cameras, but the angular field becomes smaller. The length of back focus should be longer than $0.72f$–$0.75f$ to avoid any difficulty in the operation of the mirror where $f$ is a focal length of a standard angular field, and it is a significantly large value for a lens of large aperture ratio.

The present invention not only settles the above-mentioned difficulties, but also relates to a new type of large aperture ratio lens having various features. The inventive lens is of F:1.4 and the back focus is as long as about three by four times the focal length and further the lens is corrected for spherical aberration and chromatic aberration as well as astigmatism and coma at the angular field of ±23°.

In general, a feature of a Gauss type lens system is its relatively longer back focus in comparing with its focal length. However, in case of a large aperture lens such as a F:1.4 class, despite the above-mentioned feature, the back focus has a tendency to become short since generally the total thickness of lenses of the second group is thick to contract the beam and decrease the load imparted to the rear groups for the purpose of correcting the spherical aberration. Accordingly, it is very difficult to make the back focus longer while correcting the aberration. The present invention provides a novel large aperture lens overcoming such difficulty.

The features and advantages of the present invention will be described in detail referring to the accompanying drawing, in which:

FIG. 1 is a sectional view of a lens system of the present invention in a plane including the optical axis of said lens system;

FIG. 2 and FIG. 3 show the graphs of various aberrations of the two embodiments, respectively.

According to the present invention shown in the drawing, the lens system is of a modified Gauss type, and the last lens group of the system is separated into two pieces, i.e. $G_6$ and $G_7$ and an iris is disposed between $G_3$ and $G_4$. It is effective for lengthening a back focus of a Gauss type lens system to reduce the thickness of lenses consisting of $G_2$ and $G_3$ decreasing the contraction of the beam and make the thickness of lenses $G_4$ and $G_5$ thicker for enlarging the light flux. Further, it is very effective to make the radius of curvature of the front surface of $G_4$ smaller. Here, Groups $G_2$, $G_3$ and $G_4$, $G_5$ are symmetrically disposed relative to the stop, and in such a case, in general, the change in aberration caused by the one group can be compensated by that caused by the another group, an aberration caused by decreasing the thickness of $G_2$ and $G_3$ can be compensated to some extent by increasing the thickness of $G_4$ and $G_5$. Furthermore, as aforementioned, in this invention, there is a condition that the back focus $S > 0.73f$ and for achieving this, the front radius of curvature $r_3$ of $G_2$ must be larger than the absolute value of the rear radius of curvature $|r_8|$ of $G_5$, and this means that viewing from the light incident side, a larger positive refractive power exists and by this larger positive refractive power of $r_3$, the light rays are greatly refracted with the result that it is very difficult to obtain a larger back focus S than $0.72f$–$0.75f$. In the present invention the refractive power of $r_3$ is reduced to be small so that the refractive power of the whole system becomes insufficient and for compensating this shortage the refractive power of $r_8$ is increased. That is, the first condition is:

$$d_3+d_4<d_6+d_7, \ r_3>|r_8|$$

Also, the values of spherical aberration and coma caused by decreasing the radius of curvature become much larger. These values are added to a spherical aberration caused by thinning $G_2$ and $G_3$, but these spherical aberration and coma are corrected by separating the last lens into two pieces and selecting an appropriate value for each second surface of $G_6$ and $G_7$. Since there is a fear that the decreasing of the radius of curvature $G_4$ and the thickening of lenses $G_4$ and $G_5$ result in a long total length L of the lens system and thus the light flux with a large angular field is limited by the diameter of the lens to decrease the amount of light rays, it is necessary to limit the total thickness of $G_4$ and $G_5$ to a range of from $0.2f$ to $0.3f$ and also it is preferable to limit L to a range of from $0.9f$ to $1.1f$ by thinning the thickness of $G_1$, $G_2$, $G_3$ and $G_6$, $G_7$ as far as possible.

That is, the second condition is:

$$0.2f<d_6+d_7<0.3f$$

$$0.9f<L<1.1f$$

On the other hand, since the thickness of $G_6$ and $G_7$ is limited as mentioned above, the radius of curvature of the second surface may not be freely changed in view of the necessity to maintain the peripheral thicknesses of these lenses at certain practical values, respectively. Therefore, the radius of curvature of front surface of $G_4$, which has a specific relation with these curved surfaces as mentioned above is naturally limited in view of aberration correction, that is, the third condition is:

$$0.25f<|r_6|<0.35f$$

The illustrative examples embodying the present invention are shown below, where r subscript is the radius of curvature of the surface of lens, d subscript is the thickness of lens element and the separation of the lens elements, n subscript is a refractive index and γ subscript is Abbe number.

EXAMPLE 1
[$f=1$; F=1.4]

| | | | |
|---|---|---|---|
| $r_1=+0.7655$ | $d_1=0.1260$ | $n_1=1.66446$ | $\nu_1=35.9$ |
| $r_2=+2.5053$ | $d_2=0.0019$ | | |
| $r_3=+0.5736$ | $d_3=0.1686$ | $n_2=1.69350$ | $\nu_2=53.4$ |
| $r_4=+12.4041$ | $d_4=0.0329$ | $n_3=1.64831$ | $\nu_3=33.8$ |
| $r_5=+0.3240$ | $d_5=0.3256$ | | |
| $r_6=-0.2892$ | $d_6=0.0407$ | $n_4=1.69895$ | $\nu_4=30.1$ |
| $r_7=-3.8760$ | $d_7=0.1647$ | $n_5=1.71300$ | $\nu_5=53.9$ |
| $r_8=-0.4535$ | $d_8=0.0039$ | | |
| $r_9=-2.3256$ | $d_9=0.0833$ | $n_6=1.67790$ | $\nu_6=55.5$ |
| $r_{10}=-0.6357$ | $d_{10}=0.0019$ | | |
| $r_{11}=+1.5504$ | $d_{11}=0.0620$ | $n_7=1.71300$ | $\nu_7=53.9$ |
| $r_{12}=-16.8774$ | | | |

$L=1.01f$; $S=0.75f$.

where S is the length of the back focus.

The aberrations are corrected at a range of angular field of ±23° and the length of the back focus is equal to three-fourths of the focal length. Therefore, the system can be sufficiently employed as a standard lens for single lens reflex cameras.

For the sake of reference, the sums of Seidel's aberration coefficients in this Example 1 are shown below: $\Sigma A=0.2314$, $\Sigma B=0.1428$, $\Sigma \Gamma=0.0602$, $\Sigma P=0.1101$, $\Sigma\square=0.3391$. The Seidel aberrations in case of taking the position of the stop into consideration: $\Sigma I=0.2314$, $\Sigma II=0.0270$, $\Sigma III=0.0360$, $\Sigma IV=0.0854$, $\Sigma V=0.2718$.

It is noted that coma and astigmatism are well corrected. FIG. 2 is the graphs of aberrations in this example.

EXAMPLE 2
[$f=1.0$; $S=0.7442f$]

| | | n | ν |
|---|---|---|---|
| $r_1=+0.8140$ | $d_1=0.0930$ | 1.7495 | 35.0 |
| $r_2=+2.6512$ | $d_2=0.0019$ | | |
| $r_3=+0.5620$ | $d_3=0.1202$ | 1.744 | 44.9 |
| $r_4=+2.7132$ | $d_4=0.0659$ | 1.69895 | 30.1 |
| $r_5=+0.3341$ | $d_5=0.3333$ | | |
| $r_6=-0.3227$ | $d_6=0.0465$ | 1.71736 | 29.5 |
| $r_7=-8.5727$ | $d_7=0.1647$ | 1.6779 | 55.5 |
| $r_8=-0.4953$ | $d_8=0.0058$ | | |
| $r_9=-2.3256$ | $d_9=0.0969$ | 1.713 | 53.9 |
| $r_{10}=-0.6610$ | $d_{10}=0.0019$ | | |
| $r_{11}=+1.5891$ | $d_{11}=0.0620$ | 1.713 | 53.9 |
| $r_{12}=-8.9028$ | | | |

$L=0.9921f$.

FIG. 3 is the graphs of aberrations in Example 2. It is clearly noted that all aberrations are well corrected.

The Seidel aberration coefficients are as follows:

| | I | II | $\dfrac{\text{II}-\text{IV}}{2}$ | $\dfrac{\text{II}+\text{IV}}{2}$ | V |
|---|---|---|---|---|---|
| 1 | +0.4540152 | +0.0924078 | +0.0188082 | +0.5639162 | +0.1109489 |
| 2 | +0.0286948 | −0.1188416 | +0.4921269 | +0.8226635 | −1.3687628 |
| 3 | −0.0247404 | −0.0114256 | −0.0052767 | +0.7485311 | +0.3481282 |
| 4 | +0.0454448 | −0.0612254 | +0.0824858 | +0.1593678 | −0.1035790 |
| 5 | −0.8499490 | −0.2633670 | −0.0816075 | −1.3945863 | −0.4068424 |
| 6 | −2.3329166 | +0.8884808 | −0.3383793 | −1.9711727 | +0.6218440 |
| 7 | −0.0093330 | −0.0185764 | −0.0369743 | −0.0723511 | −0.0704136 |
| 8 | +0.6468100 | −0.1860022 | +0.0534884 | +0.9226782 | +0.2499516 |
| 9 | −0.0051586 | +0.0185834 | −0.0660443 | −0.3128655 | +0.8858970 |
| 10 | +1.6498182 | −0.0877208 | −0.0046641 | +0.6390237 | −0.0337288 |
| 11 | −0.0020892 | +0.0254904 | −0.3110086 | −0.3600898 | +0.5988392 |
| 12 | +0.5923770 | −0.2982000 | +0.1501125 | +0.3469775 | −0.0991010 |
| Σ | +0.1929768 | −0.0203966 | −0.0385048 | +0.0920926 | +0.2332776 |

What is claimed is:

1. A photographic lens system of Gauss type of a large aperture ratio composed of five groups with seven lens elements having a long back focus and a stop disposed between the third and the fourth lens elements, the lens system satisfying the following conditions:

[$f=1.00$; F:1.4]

| | | | |
|---|---|---|---|
| $r_1=+0.7655$ | $d_1=0.1260$ | $n_1=1.66446$ | $\nu_1=35.9$ |
| $r_2=+2.5053$ | $d_2=0.0019$ | | |
| $r_3=+0.5736$ | $d_3=0.1686$ | $n_2=1.69350$ | $\nu_2=53.4$ |
| $r_4=+12.4041$ | $d_4=0.0329$ | $n_3=1.64831$ | $\nu_3=33.8$ |
| $r_5=+0.3240$ | $d_5=0.3256$ | | |
| $r_6=-0.2892$ | $d_6=0.0407$ | $n_4=1.69895$ | $\nu_4=30.1$ |
| $r_7=-3.8760$ | $d_7=0.1647$ | $n_5=1.71300$ | $\nu_5=53.9$ |
| $r_8=-0.4535$ | $d_8=0.0039$ | | |
| $r_9=-2.3256$ | $d_9=0.0833$ | $n_6=1.67790$ | $\nu_6=55.5$ |
| $r_{10}=-0.6357$ | $d_{10}=0.0019$ | | |
| $r_{11}=+1.5504$ | $d_{11}=0.0620$ | $n_7=1.71300$ | $\nu_7=53.9$ |
| $r_{12}=-16.8774$ | | | |

$L=1.01f$; $S=0.75f$.

where, $f$ is the combined focal length, L the total length of the lens system r subscript the radius of curvature, d subscript the thickness of the lens element and the separation of the lens elements, n subscript the refractive index on the spectrum d-line of the lens element, ν subscript the Abbe number of the lens element and S the length of back focus.

2. A photographic lens system of Gauss type of a large aperture ratio composed of five groups with seven lens elements having a long back focus and a stop disposed between the third and the fourth lens elements, the lens system satisfying the following conditions:

[$f=1.0$; F: 1.4]

| | | | |
|---|---|---|---|
| $r_1=+0.8140$ | $d_1=0.0930$ | $n_1=1.7495$ | $\nu_1=35.0$ |
| $r_2=+2.6512$ | $d_2=0.0019$ | | |
| $r_3=+0.5620$ | $d_3=0.1202$ | $n_2=1.744$ | $\nu_2=44.9$ |
| $r_4=+2.7132$ | $d_4=0.0659$ | $n_3=1.69895$ | $\nu_3=30.1$ |
| $r_5=+0.3341$ | $d_5=0.3333$ | | |
| $r_6=-0.3227$ | $d_6=0.0465$ | $n_4=1.71736$ | $\nu_4=29.5$ |
| $r_7=-8.5727$ | $d_7=0.1647$ | $n_5=1.6779$ | $\nu_5=55.5$ |
| $r_8=-0.4953$ | $d_8=0.0058$ | | |
| $r_9=-2.3256$ | $d_9=0.0969$ | $n_6=1.713$ | $\nu_6=53.9$ |
| $r_{10}=-0.6610$ | $d_{10}=0.0019$ | | |
| $r_{11}=+1.5891$ | $d_{11}=0.0620$ | $n_7=1.713$ | $\nu_7=53.9$ |
| $r_{12}=-8.9028$ | | | |

$L=0.9921f$; $S=0.7442f$.

where, $f$ is the combined focal length, L the total length of the lens system, $r$ subscript the radius of curvature, $d$ subscript the thickness of the lens element and the separation of the lens elements, $n$ subscript the refractive index on the spectrum $d$-line of the lens element, $v$ subscript the Abbe number of the lens element and S the length of back focus.

References Cited
UNITED STATES PATENTS
2,019,985  11/1935  Lee _____ 350—217
2,959,103  11/1960  Cook _____ 350—217X JOHN K. CORBIN, Primary Examiner